March 2, 1965 F. L. RAGONESE 3,172,019

SELF-SUSTAINING SWITCH CIRCUITS

Filed June 8, 1961

INVENTOR.
FRANK L. RAGONESE

BY Richard Franklin

ATTORNEY

United States Patent Office 3,172,019
Patented Mar. 2, 1965

3,172,019
SELF-SUSTAINING SWITCH CIRCUITS
Frank L. Ragonese, Trumbull, Conn., assignor to Sperry Rand Corporation, New York, N.Y., a corporation of Delaware
Filed June 8, 1961, Ser. No. 115,704
10 Claims. (Cl. 317—148.5)

Figure 1:
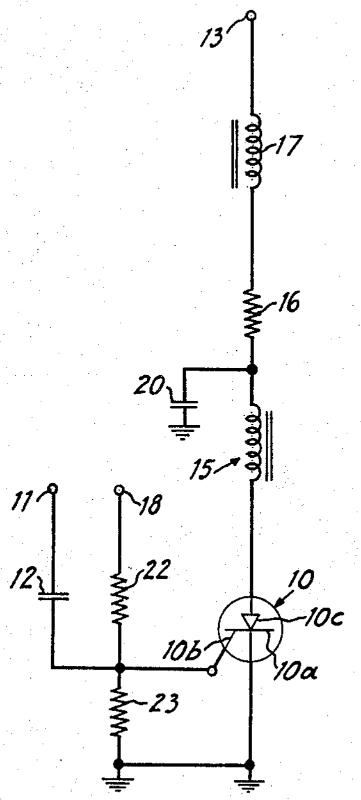

This invention relates to switch control circuits. More particularly it relates to a circuit which uses only passive elements to automatically turn off a self-sustaining electronic switch which is continuously connected to a power supply.

As used in this application, the term "self-sustaining switch" refers to an element which normally has a substantially high impedance, which shows a substantially low impedance in response to an input signal and which remains in the low impedance state until altered.

Heretofore the problem of controlling high speed self-sustaining switch circuits has been solved by using active elements such as thyratrons to connect and disconnect the switches to the power supply. Arrangements of this type have been expensive, cumbersome and wasteful of power.

In one application of such switch circuits they are used to operate print hammers at appropriate times in the cycle of a rotating print wheel of high speed printing machines such as the type used as data processing machine outputs. Employing known methods of control this has involved using thyratrons to connect the switches to the power supply for charging, disconnecting the switches, again by controlling the thyratrons, waiting until the conclusion of the next print cycle and then simultaneously recharging all of the switches.

It can be seen from the above that not only does this system require the inclusion of additional active elements but also there is regular peak loading on the power supply. In addition, further control circuitry must be used to regulate and time the operation of the active elements.

Accordingly, it is an object of this invention to provide a switch control unit which uses passive elements to control a power supply line.

It is a further object of this invention to provide for the automatic turn-off of a high speed electronic switch.

It is a further object of this invention to provide a circuit which permits the automatic recharging of a self-sustaining switch circuit.

It is a still further object of this invention to provide a power amplifier control circuit for use in a high speed print actuator drive wherein peak loading on the power supply is reduced in typical operation.

Generally speaking, in accordance with this invention, a circuit is provided having a variable impedance connected to a power supply through a load and delay means. A storage element is connected to that circuit, in parallel with the load and the variable impedance. The circuit is arranged so that the variable impedance normally presents a substantially open circuit to the power supply and the storage element, and a substantially closed circuit to them upon receipt of an input signal. The delay means in series between the power supply and the variable impedance prevents the power supply from affecting the variable impedance for a time greater than the duration of the low impedance state of the variable impedance.

Figure 3:
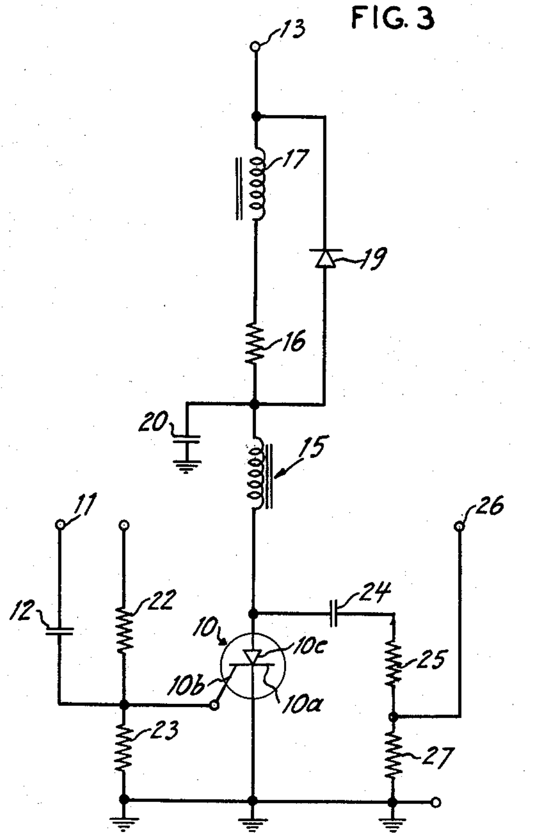

For a better understanding of the invention, together with other and further objects thereof, reference is had to the following description taken in connection with the accompanying drawings:

FIG. 1 is a circuit for the control of a high speed switch using only passive elements therefor. FIGS. 2*a*–2*d* show wave-forms of voltages and currents at various points in the circuit of FIG. 1 during its operation. FIG. 3 is a modification of the circuit shown in FIG. 1.

Referring now to FIG. 1 a high speed switch 10, which in the embodiment shown is a silicon controlled rectifier (SCR), has its cathode **10*a* connected to ground and its control electrode or gate 10*b* connected to an input terminal 11 through a coupling capacitor 12. The anode 10*c* of SCR 10 is connected to a source of positive potential 13. The series circuit connecting anode 10*c* to power supply 13 includes a load 15 and delay means which in this embodiment comprises a resistance 16 and an inductance 17. Also included in the circuit is an energy storage element 20, which in this embodiment is a capacitor, connected from the junction of coil 15 and resistance 16 to ground. Load 15** in the embodiment shown, is a coil which might be used, for example, to control the firing of a hammer in a print operation of a high speed printer.

SCR 10 in its operating condition is preferably held "strongly off:" by a bias voltage applied to control electrode **10*b*. A circuit for this purpose includes resistances 22 and 23 which are connected in series between bias voltage supply terminal 18 and the ground. The junction of resistances 22 and 23 is connected to the junction of a coupling capacitor 12 and control electrode 10*b*** as shown.

Figure 2:
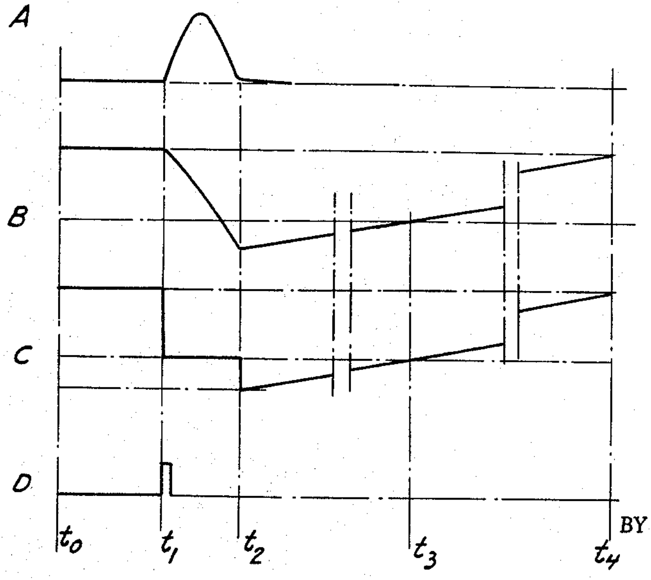

FIG. 2 shows wave-forms at various points in the circuit of FIG. 1 during its operation. Line A indicates the transient discharge current from capacitor 20; line B indicates the transient discharge voltage from capacitor 20; line C indicates the anode to cathode voltage across SCR 10; line D indicates the input signal applied to terminal 11 of FIG. 1. The wave-forms of this figure are also useful for understanding the circuit shown in FIG. 3.

The operation of the circuit will now be explained by the following description read in conjunction with FIGS. 1 and 2. In its normal operating state the circuit is "open", silicon controlled rectifier 10 being held non-conducting by the bias from source 18 and resistances 22 and 23 applied to control electrode **10*b*. Since voltage supply 13 is always connected to the circuit, capacitor 20 will be charged to substantially that voltage, as shown at time $t_0$–$t_1$ of line B, FIG. 2. At time $t_1$ an input signal of the type shown in FIG. 2D is applied to terminal 11, and the control electrode 10*b* of SCR 10. SCR 10 which is analagous in operation to a thyratron, thereupon becomes conductive. As is shown in FIG. 2, lines A, B and C, the voltage drop across SCR 10 very rapidly approaches zero as current flows from capacitor 20 through coil 15 to ground. The transient characteristic of this discharge is primarily governed by the values of capacitor 20, load 15 and the anode to cathode drop across SCR 10. By virtue of the presence of coil 15 in this circuit, the voltage in capacitor 20 will be completely discharged before the termination of current flow from that element. The continued flow of current from capacitor 20**, shown in FIG. 2, line A, causes that element to show a negative potential as indicated on line B at time $t_2$.

SCR 10 will stop conducting when its anode to cathode current is below the sustaining level. The negative potential on the load side of capacitor 20 insures that SCR 10 will remain off despite any induced voltages which appear in the load. For a use such as in a high speed printer, the rapid closure of the print actuator means could cause such induced voltages and by virtue of the negative potential drop across SCR 10, these induced voltages will not affect operation of this circuit.

The value of inductance 17 is chosen high enough to act as a very high impedance during the time required for the transient discharge of capacitor 20 through coil 15 and SCR 10 to be completed. In addition, the impedance of inductance 17 is chosen low enough so that, in conjunction with resistance 16, it permits capacitor 20 to be completely recharged to the level of voltage source 13 during the time allotted. Effectively, then, inductance 17 and resistor 16 act as a delay to the energy from potential source 13, preventing that potential source from directly affecting SCR 10. Therefore, though potential source 13 is continuously connected to the circuit, it is limited to the automatic recharge of capacitor 20 after each discharge thereof.

Referring now to FIG. 3, a modification of the circuit shown in FIG. 1 is substantially the same as that circuit and identical reference numerals refer to identical parts of the circuits.

A diode 19 is connected between, and poled so as to be conductive from, the junction of elements 15, 16 and 20, to potential source 13.

When the discharge transient time of capacitor 20 approaches the recharge interval because of application requirements, the values of inductance 17 and resistance 16 are such that the voltage across capacitor 20 will "ring" or fluctuate about the level of potential source 13. In a use such as a high speed printer hammer actuating control this is undesirable, since too great or too little charge on capacitor 20 might accelerate or delay the instant the print hammer reaches the print position causing an error in the output. Diode 19 solves this problem by clamping the junction of capacitor 20, coil 15 and resistance 16 so that it cannot exceed the level of potential source 13.

A capacitor 24 is connected to the junction of coil 15 and anode 10*c* of SCR 10. A resistance 25 is connected to the other side of capacitor 24. The other end of resistance 25 is connected to a terminal 26 which may be, for example, a check signal output to indicate conduction of SCR 10 and the existence of current through the actuator coil 15. Connected to the junction of resistance 25 and output 26 is a resistance 27. The other end of resistance 27 is returned to ground.

In addition to providing the check signal output as set forth above, this branch circuit also serves to improve the operation of the switch circuit by quickly bringing the anode current of SCR 10 to a self-sustaining level. Inclusion of the branch circuit consisting of capacitor 24 and resistances 25 and 27 permits the input signal width to be reduced below the 10 volts at 15 milliamps, 2 microsecond duration required for the embodiment shown in FIG. 1.

If desired, SCR 10 might be replaced by a thyratron or any other element which has the characteristics of presenting a very high impedance in the off condition, the ability to switch to a low impedance state by the application of a control signal and to remain in the low impedance state after the cessation of the control signal until it is again changed to its high impedance condition. Also, if desired, load 15 could be placed in the cathode circuit of SCR 10 between cathode 10*a* and ground, or with appropriate changes in the polarity of the potentials and adjustment of circuit parameters, the entire anode circuit of SCR 10, including elements 13, 15, 16, 17 and 20, etc., could be placed in the cathode circuit of SCR 10.

For the sake of clarity and without intent to limit in any way the scope of this invention, typical values for the components of the embodiment shown in FIGS. 1 and 3 are as follows:

Resistors:

| | | |
|---|---|---|
| **16** | ohms | 100 |
| **22** | do | 6.2K |
| **23** | do | 1K |
| **25** | do | 3.6K |
| **27** | do | 390 |

Inductances:
- 17 4 henries at 50 ma. 160 ohms.
- 15 5 millihenries av. inductance, 11 ohms.

Capacitors:

| | | |
|---|---|---|
| **12** | mf | .047 |
| **20** | μf | 14 |
| **24** | μf | .0022 |

Diode 19 ________ 1N2070

Silicon controlled rectifier 10 ____ Transitron SW 1029

2 megohms off
1 volt at 1 amp. on

| | | |
|---|---|---|
| Potential source **13** | volts | +200 |
| Bias source **18** | do | −15 |

While the application shows and describes certain preferred embodiments of the invention and the best mode in which it is contemplated employing that invention, it should be understood that modifications and changes may be made without departing from the spirit and scope thereof, as will be clear to those skilled in the art, and the scope of the invention is intended to be limited only by the appended claims.

What is claimed is:

1. In combination a controlled rectifier having an anode, a cathode, and a control electrode, bias means connected to said control electrode normally maintaining said rectifier in a high impedance condition, an inductive load having one end connected to the anode of said controlled rectifier, a first capacitor having one end connected to the other end of said load, the other end of said capacitor and the cathode of said rectifier being connected to a common reference potential, a resistor having one end connected to the junction of said capacitor and said load, an inductance having one end connected to the other end of said resistor, a source of positive potential, the other end of said inductance connected to said source of potential, an input terminal connected to said control electrode for applying signals to said control electrode overcoming the effect of said bias means, a second capacitor of sufficiently smaller capacitance than said first capacitor to assure resonant turn-off of said controlled rectifier by said first capacitor and said inductive load, one end of said second capacitor connected to the junction of said inductive load, and said controlled rectifier, a second resistor, one end of said second resistor connected to the other end of said second capacitor, a third resistor, one end of said third resistor connected to the other end of said second resistor, the other end of said third resistor being connected to a common reference potential, and an output terminal connected to the junction of said second and third resistors.

2. The circuit described in claim 1 and further including a diode, one end of said diode connected to the junction of said first capacitor and said inductive load, the other end connected to said source of positive potential, said diode poled so as to be conductive from said first capacitor to said source of positive potential.

3. A circuit comprising:

(*a*) a self-sustaining electronic switch element having an anode-to-cathode circuit and a control electrode;

(*b*) a power supply connected for sending a pulse through the anode-to-cathode circuit of said electronic switch element;

(*c*) means connected for biasing said control electrode for maintaining said electronic switch element in a cut-off condition;

(*d*) means connected for applying a triggering input to said control electrode to turn on said electronic switch element;

(*e*) first and second capacitors each connected to be charged by said power supply when said electronic switch element is cut off and to discharge through said anode-to-cathode circuit when said electronic switch is turned on;

(*f*) impedance means arranged to establish the charging rate of a first one of said capacitors but substantially not to affect the rate of said first capacitor discharge;

(*g*) and an inductance connected in series with the flow of current between said first capacitor and said anode-to-cathode circuit to prolong said flow so that said first capacitor is driven to a polarity opposite to its original charge polarity, thereby reversing the anode-to-cathode potential to cut off said electronic switch element;

(*h*) a second one of said capacitors being connected to discharge through a path excluding said inductance whereby the rate of current build-up through said electronic switch element is increased to more quickly achieve a self-sustaining condition, so that said electronic switch element may be turned on by a shorter triggering input.

4. A circuit as in claim 3, further comprising:

(*a*) second impedance means connected in series with said second capacitor discharge path to develop a potential drop thereacross during said second capacitor discharge;

(*b*) and means for taking said potential drop as an output indicating successful turn-on of said electronic switch element.

5. A circuit as in claim 3, further comprising:

(*a*) a rectifier shunted across said first-capacitor-charging impedance means whereby to reduce oscillations in said first-capacitor-charging circuit.

6. A circuit comprising:

(*a*) a self-sustaining electronic switch element having an anode-to-cathode circuit and a control electrode;

(*b*) a power supply and an inductive load both in series with said anode-to-cathode circuit;

(*c*) means connected to said inductive load and charged by said power supply when said electronic switch is cut off;

(*d*) means for governing the potential of said control electrode whereby to first maintain said electronic switch element in a cut off condition and subsequently to turn on said electronic switch element;

(*e*) and a capacitor connected to be charged by said power supply when said electronic switch element is cut off and to discharge through said anode-to-cathode circuit through a path excluding said inductive load when said electronic switch element is turned on whereby the rate of current build-up through said electronic switch is increased to more quickly achieve a self-sustaining condition.

7. A circuit as in claim 6, further comprising:

(*a*) impedance means connected in series with said capacitor discharge path to develop a potential drop thereacross during said discharge;

(*b*) and means for taking said potential drop as an output indicating successful turn-on of said electronic switch element.

8. A print-hammer-actuating circuit for a high speed printer comprising:

(*a*) a solenoid coil operatively arranged to actuate said print hammer;

(*b*) a self-sustaining electronic switch element having a control electrode and an anode-to-cathode circuit;

(*c*) said anode-to-cathode circuit being connected in series with said solenoid coil whereby to energize said solenoid and whereby said solenoid comprises an inductive load for said anode-to-cathode circuit;

(*d*) a power supply connected in series with said anode-to-cathode circuit and said solenoid coil to send an energizing pulse therethrough;

(*e*) means connected for biasing said control electrode to maintain said electronic switch in a cut-off condition;

(*f*) means connected for applying a print signal in the form of a triggering input to said control electrode to turn on said electronic switch element;

(*g*) first and second capacitors each connected to be charged by said power supply when said electronic switch element is cut off;

(*h*) a first one of said capacitors being connected to discharge through a path including said anode-to-cathode circuit and said solenoid coil when said electronic switch element is turned on;

(*i*) impedance means arranged to establish the charging rate of said first capacitor but substantially not to affect the rate of said first capacitor discharge;

(*j*) said solenoid coil being connected in series with the flow of current between said first capacitor and said anode-to-cathode circuit to prolong said flow so that said first capacitor is driven to a polarity opposite to its original charge polarity, thereby reversing the anode-to-cathode potential to cut off said electronic switch element;

(*k*) a second one of said capacitors being connected to discharge through said anode-to-cathode circuit when said electronic switch element is turned on, the discharge path of said second capacitor excluding said solenoid coil whereby the rate of current build-up through said electronic switch is increased to more quickly achieve a self-sustaining condition, so that said print hammer may be actuated by a shorter print signal.

9. A circuit as in claim 8, further comprising:

(*a*) second impedance means connected in series with said second capacitor discharge path to develop a potential drop thereacross during said second capacitor discharge;

(*b*) and means for taking said potential drop as an output indicating successful actuation of said print hammer.

10. A circuit as in claim 8, further comprising:

(*a*) a rectifier shunted across said first capacitor-charging impedance means whereby to reduce oscillations in the first-capacitor-charging circuit to achieve more uniform printing operation.

References Cited in the file of this patent

Stahl: "Core Driver," IBM Technical Disclosure Bulletin, vol. 2, No. 1, June 1959, page 26.

Applications and Circuit Design Notes, Solid State Products, Inc., Bulletin D420-02-12-59, pages 10-13.